US006807735B2

(12) United States Patent
Crean

(10) Patent No.: US 6,807,735 B2
(45) Date of Patent: Oct. 26, 2004

(54) METHOD OF FABRICATING A MOTORHOME

(75) Inventor: Johnnie Crean, Chino, CA (US)

(73) Assignee: Alfa Leisure, Inc., Ontario, CA (US)

(*) Notice: Subject to any disclaimer, the term of this patent is extended or adjusted under 35 U.S.C. 154(b) by 147 days.

(21) Appl. No.: 09/965,463

(22) Filed: Sep. 26, 2001

(65) Prior Publication Data

US 2002/0066184 A1 Jun. 6, 2002

Related U.S. Application Data

(63) Continuation-in-part of application No. 09/728,946, filed on Dec. 1, 2000, now Pat. No. 6,540,285.
(60) Provisional application No. 60/318,136, filed on Sep. 7, 2001.

(51) Int. Cl.[7] .............................................. B21D 53/88
(52) U.S. Cl. ........................ 29/897.2; 29/469; 29/897; 296/204
(58) Field of Search ................................ 29/897.2, 469, 29/462; 296/204, 183, 182, 37.6, 37.1, 164, 165, 175, 176, 26.13, 156

(56) References Cited

U.S. PATENT DOCUMENTS

| 986,731 A | 3/1911 | McGerry .................... 454/105 |
| 1,536,518 A | 5/1925 | Osborn .......................... 52/67 |
| 2,000,477 A | 5/1935 | Carry .......................... 62/289 |
| 2,089,799 A | 8/1937 | Hulse .......................... 454/87 |
| 2,150,615 A | 3/1939 | Sword .................... 296/26.13 |
| 2,177,394 A | 10/1939 | Pierce .................... 296/26.13 |
| 2,225,319 A | 12/1940 | Rollo .......................... 296/171 |
| 2,268,502 A | 12/1941 | Browne .................... 454/105 |
| 2,271,158 A | 1/1942 | Browne ........................ 237/5 |
| 2,463,255 A | 3/1949 | Elliott .......................... 105/59 |
| 2,606,057 A | 8/1952 | Johnson .................... 296/171 |

(List continued on next page.)

FOREIGN PATENT DOCUMENTS

| CA | 2036838 | 3/1992 |
| CH | 353262 | 9/1957 |
| DE | 42 04 640 A | 8/1993 |
| EP | 0063008 | 10/1982 |
| EP | 0148559 | 7/1985 |
| GB | 616274 | 1/1949 |
| GB | 2088789 | 11/1980 |
| GB | 2 260 951 | 5/1993 |
| IT | 478931 | 5/1951 |

OTHER PUBLICATIONS

Brochure: Alfa™ Gives you More!; Gold / Ideal, 1999; 11/98.

Brochure: Ideal from Alfa, 11/96.

*Primary Examiner*—I Cuda-Rosenbaum
*Assistant Examiner*—Marc Jimeney
(74) *Attorney, Agent, or Firm*—Knobbe, Martens, Olson & Bear, LLP

(57) ABSTRACT

A method of fabricating a motorhome, wherein the motorhome comprises a chassis, a vehicle frame, and a coach body. In one embodiment, the method begins by prefabricating the frame by joining a plurality of parallel elongate members with cross-tie members. The frame is prefabricated separate from the chassis, and in one embodiment, the frame is prefabricated upside down such that the underside of the frame is accessible for attachment of a plurality of bulkheads. Then, the frame is rotated upright and positioned atop the chassis. In one embodiment, the rails of the chassis lie inside a channel defined by the plurality of bulkheads. Next, additional bulkheads are joined to the frame and chassis to further interconnect the frame and chassis. Preferably, the additional bulkheads comprise an opening such that the additional bulkheads can surround the chassis on all sides. Finally, the coach body is assembled on the frame.

9 Claims, 7 Drawing Sheets

U.S. PATENT DOCUMENTS

| | | | |
|---|---|---|---|
| 2,639,187 A | 5/1953 | Grumbache | 296/37.6 |
| 2,704,223 A | 3/1955 | Houdart | 296/26.13 |
| 2,788,791 A | 4/1957 | Pospisil et al. | 135/88.07 |
| 2,846,262 A | 8/1958 | Ray | 296/161 |
| 2,846,263 A | 8/1958 | La Rue | 296/182 |
| 2,876,035 A | 3/1959 | Houdart | 296/26.12 |
| 3,019,047 A | 1/1962 | Ahrens | 296/178 |
| 3,106,750 A | 10/1963 | Jarman | 52/67 |
| 3,165,350 A | 1/1965 | Willson | 296/156 |
| 3,254,914 A | 6/1966 | Steck | 296/181 |
| 3,287,058 A | 11/1966 | Wells | 296/37.14 |
| 3,300,839 A | 1/1967 | Lichti | 29/897.35 |
| 3,341,986 A | 9/1967 | Brosig | 52/67 |
| 3,343,473 A | 9/1967 | Gillick et al. | 454/99 |
| 3,363,231 A | 1/1968 | Grosgebauer et al. | 280/432 |
| 3,565,480 A | 2/1971 | McCollum et al. | 296/168 |
| 3,566,614 A | 3/1971 | Imral | 62/262 |
| 3,572,809 A | 3/1971 | Buland | 296/175 |
| 3,608,954 A | 9/1971 | Lynd | 296/164 |
| 3,719,386 A | 3/1973 | Puckett et al. | 296/26.13 |
| 3,735,998 A | 5/1973 | Green | 280/795 |
| 3,740,088 A | 6/1973 | Ratcliff | 296/171 |
| 3,801,138 A | 4/1974 | Quick | 280/478.1 |
| 3,825,281 A | 7/1974 | Howard | 280/423.1 |
| 3,850,470 A | 11/1974 | Trelle | 296/175 |
| 3,887,220 A | 6/1975 | Hall | 280/423.1 |
| 3,895,726 A | 7/1975 | Rassieur | 414/522 |
| 3,902,752 A | 9/1975 | Pelletier | 280/727 |
| 3,915,492 A | 10/1975 | Agnese | 296/172 |
| 3,918,510 A | 11/1975 | Hayward | 160/45 |
| 3,959,985 A | 6/1976 | Schulze, Sr. | 62/239 |
| 3,962,885 A | 6/1976 | Schoenbachler et al. | 62/239 |
| 3,989,119 A | 11/1976 | Cady | 180/89.1 |
| 4,014,586 A | 3/1977 | Swofford | 296/169 |
| 4,049,312 A | 9/1977 | Rudbeck | 296/178 |
| 4,106,732 A | 8/1978 | Whiting | 296/171 |
| 4,108,326 A | 8/1978 | Bertolini | 220/1.5 |
| 4,109,954 A | 8/1978 | Wall | 296/161 |
| 4,147,379 A | 4/1979 | Winslow | 280/781 |
| 4,175,576 A | 11/1979 | Iby | 135/88.1 |
| 4,181,347 A | 1/1980 | Clark | 379/199 |
| 4,232,884 A | 11/1980 | DeWitt | 280/785 |
| 4,322,108 A | 3/1982 | McPherson | 296/164 |
| 4,457,554 A | 7/1984 | Fuisz et al. | 296/179 |
| 4,468,823 A | 9/1984 | Tounjian | 5/417 |
| 4,480,866 A | 11/1984 | Komatsu | 296/21 |
| 4,500,132 A | 2/1985 | Yoder | 296/171 |
| 4,531,453 A | 7/1985 | Warman et al. | 454/139 |
| 4,550,946 A | 11/1985 | Hanemaayer | 296/156 |
| 4,589,463 A | 5/1986 | Ryan | 160/88 |
| RE32,262 E | 10/1986 | Stewart | 296/171 |
| 4,652,041 A | 3/1987 | Barber et al. | 296/171 |
| 4,653,125 A | 3/1987 | Porter | 4/301 |
| 4,659,132 A | 4/1987 | Day | 296/24.1 |
| 4,719,954 A | 1/1988 | Curtis et al. | 160/67 |
| 4,724,748 A | 2/1988 | Geyer | 454/120 |
| 4,728,144 A | 3/1988 | Crean | 296/168 |
| 4,729,594 A | 3/1988 | Hoff | 296/161 |
| 4,746,164 A | 5/1988 | Crean | 296/164 |
| 4,772,063 A | 9/1988 | Amy | 296/37.1 |
| 4,776,631 A | 10/1988 | Sargent et al. | 296/156 |
| 4,841,897 A | 6/1989 | Claflin | 114/344 |
| 4,863,189 A | 9/1989 | Lindsay | 280/789 |
| 4,867,502 A | 9/1989 | Sylvester et al. | 296/161 |
| 4,935,599 A | 6/1990 | Babin et al. | 219/202 |
| 4,953,449 A | 9/1990 | Jackson | 454/138 |
| 4,955,661 A | 9/1990 | Mattice | 296/171 |
| 4,957,323 A | 9/1990 | Johnson | 296/181 |
| 4,960,299 A | 10/1990 | Steadman | 296/26.15 |
| 4,971,286 A * | 11/1990 | Silhan | 248/676 |
| 4,971,355 A | 11/1990 | Studdard | 280/789 |
| 4,974,899 A | 12/1990 | Sargent | 296/156 |
| 5,028,072 A | 7/1991 | Lindsay | 280/789 |
| 5,061,001 A | 10/1991 | Madden et al. | 296/26.12 |
| 5,066,067 A | 11/1991 | Ferdows | 296/193.04 |
| 5,090,749 A | 2/1992 | Lee | 296/171 |
| 5,100,196 A | 3/1992 | Dodgen | 296/156 |
| 5,100,716 A | 3/1992 | Juneau | 428/167 |
| 5,112,082 A | 5/1992 | Clelland | 280/783 |
| 5,143,418 A | 9/1992 | Fouquet | 296/182 |
| 5,171,056 A | 12/1992 | Faludy et al. | 296/163 |
| 5,199,120 A | 4/1993 | Holmes | 5/419 |
| 5,237,782 A | 8/1993 | Cooper | 52/67 |
| 5,242,185 A | 9/1993 | Carr et al. | 280/423.1 |
| 5,248,005 A | 9/1993 | Mochizuki | 175/85 |
| 5,263,894 A | 11/1993 | Hirakawa et al. | 454/105 |
| 5,280,990 A | 1/1994 | Rinard | 296/180.1 |
| 5,291,701 A | 3/1994 | Delacollette et al. | 52/67 |
| 5,307,645 A | 5/1994 | Pannell | 62/244 |
| 5,314,205 A | 5/1994 | Glesmann | 280/783 |
| 5,342,106 A * | 8/1994 | Fischer | 296/204 |
| 5,358,298 A | 10/1994 | Fate | 296/26.11 |
| 5,374,094 A | 12/1994 | Smith et al. | 296/26.05 |
| 5,389,035 A | 2/1995 | Ishida et al. | 454/99 |
| 5,401,050 A | 3/1995 | Baker | 280/656 |
| 5,403,063 A | 4/1995 | Sjostedt et al. | 296/193.07 |
| 5,419,607 A | 5/1995 | Oliveira | 296/159 |
| 5,501,504 A | 3/1996 | Kunz | 296/164 |
| 5,516,182 A | 5/1996 | Aragon et al. | 296/100.05 |
| 5,529,825 A | 6/1996 | Sutherland | 428/88 |
| 5,560,444 A | 10/1996 | Tiedge | 180/209 |
| 5,566,918 A | 10/1996 | Becker | 248/351 |
| 5,575,453 A | 11/1996 | Dion | 251/61.1 |
| 5,577,351 A | 11/1996 | Dewald, Jr. et al. | 52/67 |
| 5,620,224 A | 4/1997 | DiBiagio et al. | 296/26.13 |
| 5,634,683 A | 6/1997 | Young | 296/165 |
| 5,658,031 A | 8/1997 | DiBiagio et al. | 296/26.01 |
| 5,658,032 A | 8/1997 | Gardner | 296/26.01 |
| 5,673,962 A | 10/1997 | Maieli et al. | 296/164 |
| 5,706,616 A | 1/1998 | Fernandez | 52/143 |
| 5,718,253 A | 2/1998 | McNamee | 135/88.13 |
| 5,734,336 A | 3/1998 | Smithline | 340/903 |
| 5,743,701 A | 4/1998 | Green | 414/498 |
| 5,746,473 A | 5/1998 | Crean | 296/181 |
| 5,785,373 A | 7/1998 | Futrell et al. | 296/26.01 |
| 5,788,306 A | 8/1998 | DiBiagio et al. | 296/26.02 |
| 5,791,715 A | 8/1998 | Nebel | 296/26.13 |
| 5,791,726 A | 8/1998 | Kaufman | 296/181 |
| 5,800,002 A | 9/1998 | Tiedge et al. | 296/26.15 |
| 5,833,294 A | 11/1998 | Williams et al. | 296/24.1 |
| 5,863,070 A | 1/1999 | Williams et al. | 280/781 |
| 5,894,698 A | 4/1999 | Dewald, Jr. et al. | 52/67 |
| 5,902,001 A | 5/1999 | Schneider | 296/26.13 |
| 5,915,774 A | 6/1999 | Tiedge | 296/26.13 |
| 5,921,615 A | 7/1999 | Gimenez | 296/164 |
| 5,934,026 A | 8/1999 | Green | 52/143 |
| 5,940,012 A | 8/1999 | Studebaker | 340/932.2 |
| 5,951,082 A | 9/1999 | DiBiagio et al. | 296/26.13 |
| 5,983,576 A | 11/1999 | Hanser et al. | 52/67 |
| 6,007,142 A | 12/1999 | Gehman et al. | 296/171 |
| 6,048,016 A | 4/2000 | Futrell et al. | 296/26.13 |
| 6,098,346 A | 8/2000 | Miller et al. | 52/67 |
| 6,108,983 A | 8/2000 | Dewald, Jr. et al. | 52/67 |
| 6,158,794 A | 12/2000 | Flanagan | 296/37.6 |
| 6,170,903 B1 | 1/2001 | Crean | 296/168 |
| 6,182,401 B1 | 2/2001 | McManus et al. | 52/67 |
| 6,202,362 B1 | 3/2001 | McManus et al. | 52/67 |
| 6,227,607 B1 | 5/2001 | Dewald, Jr. et al. | 296/165 |
| 6,231,115 B1 | 5/2001 | Crean | 296/182 |
| 6,257,638 B1 | 7/2001 | Graber | 296/26.09 |
| 6,260,909 B1 | 7/2001 | Crean et al. | 296/163 |

| | | | | | | |
|---|---|---|---|---|---|---|
| RE37,351 E | 9/2001 | Crean ......................... 296/181 | | 6,416,116 B1 | 7/2002 | Stanton et al. .............. 296/178 |
| 6,293,612 B1 | 9/2001 | Crean ......................... 296/175 | | 6,491,578 B2 | 12/2002 | Yoshinori et al. ........... 454/139 |
| 6,302,475 B1 | 10/2001 | Anderson ................... 296/175 | | 2002/0074815 A1 | 6/2002 | McManus et al. ....... 296/26.01 |
| 6,315,354 B1 | 11/2001 | Tani et al. .................. 296/208 | | | | |
| 6,343,830 B1 | 2/2002 | Ingram et al. .............. 296/168 | | | | |
| 6,345,854 B1 | 2/2002 | McManus ................ 296/26.13 | | | | |

\* cited by examiner

METHOD OF FABRICATING A MOTORHOME

RELATED APPLICATIONS

This application is a continuation-in-part of U.S. application Ser. No. 09/728,946 entitled "Motorhome With Increased Interior Height" filed Dec. 1, 2000 now U.S. Pat. No. 6,540,285 and claims the benefit of U.S. Provisional Application No. 60/318,136 filed Sep. 7, 2001.

BACKGROUND OF THE INVENTION

1. Field of the Invention

The present invention relates to the field of recreational vehicle fabrication and, in particular, to methods of prefabricating a motorhome frame and then joining the frame to a prefabricated vehicle chassis to provide a motorhome with increased structural strength and interior ceiling height with improved production efficiency and reduced cost and time of production.

2. Description of the Related Art

Motorhomes have become an increasingly popular and common means of recreation. Motorhomes are self-propelled vehicles that include a living space inside. Motorhomes typically provide sleeping areas, cooking facilities, and self-contained water supplies and toilet facilities. More elaborate motorhomes can include refrigerator/freezer units, showers and/or bathtubs, air conditioning, heaters, built in generators and/or power inverters, televisions, VCRs, and clothes washers and dryers. Motorhomes provide many of the amenities of a residential home while on the road away from home and are popular for this reason. Motorhome users will typically use the motorhome to travel to a recreational area and live in the motorhome for some period of time. It is not unusual for people, particularly retired persons, to use a motorhome as their primary residence. Motorhome users often have families with children and, as their trips are often of a recreational nature, will often invite friends or family along on the trip.

It can be understood that since a motorhome will often be used by a large number of people and often for an extended period of time, the motorhome manufacturers and customers will seek as many amenities and as much interior living space as possible. A major goal of motorhome manufacturers and their customers is to maximize the amount of usable living space inside their motorhomes. However, the overall size of an motorhome is limited both by vehicle code regulations and by practical limitations on what is reasonable to drive and maneuver. Vehicle codes restrict the maximum height, width, and length of vehicles that may be driven on public roads. Also, as a vehicle increases in size, it becomes increasingly difficult to drive and can become physically too large to pass through locations that the driver may wish to go. In addition, as the motorhome gets physically larger, more fuel is required to move it, which increases the cost of operation. Accordingly, many motorhomes are provided with slide-out room structures which are extendable so as to increase the motorhome's footprint and interior living space once the vehicle comes to rest.

An additional design constraint on the construction and design of motorhomes is their overall weight. Since an motorhome is intended to be mobile, an integral power plant is provided and the engine and drive-train have an upper design limit on the weight it is capable of moving. In addition, the chassis, suspension, wheels, and brakes of a motorhome also have upper design limits as to how much weight they can safely accommodate. These weight limits are established after careful engineering analysis and the weight ratings are endorsed and enforced by responsible governmental agencies. Exceeding the established weight limits of a power-train or chassis component can lead to excessive wear and failure, unacceptable performance, and exposure to liability in case of an accident. It is also highly desirable that as much payload as possible is available to accommodate passengers and cargo, i.e. available weight load between the wet weight of the motorhome and the total maximum gross weight of the motorhome.

A particular issue with the weight of a motorhome is its distribution along a vertical axis. The distance of the vehicle's center of mass from the road surface has a dramatic effect on the handling characteristics of the vehicle. The closer the center of mass is to the road surface, the shorter the moment arm between the center of mass and the roll axis of the vehicle. The shorter the moment arm between the center of mass and the roll axis of the vehicle, the less tendency the vehicle will have to lean in turns. Leaning in turns is uncomfortable for the occupants and typically places uneven loads on the tires and suspensions, compromising turning ability. Motorhomes, typically being quite tall, often exhibit significant leaning in turns. However, within the height available in a motorhome, the weight should be concentrated as low as possible. For this reason, heavy items, such as generators, storage and holding tanks for water and fuel, and the engine are optimally placed low in the chassis.

Since motorhomes are mobile structures, they are typically exposed to the stresses of driving over roads that are in places quite rough. In addition, an motorhome will often have to travel over some distance of dirt surface to reach a camping space. Since an motorhome is typically used outdoors, it is exposed to the stresses of inclement weather and high winds. It can be appreciated that structural integrity is highly desired in an motorhome. However, the weight and size limitations previously mentioned place a limit on the strength of an motorhome. Accordingly, motorhomes are constructed to be as strong, but as light as possible.

The chassis of a motorhome is typically constructed on a steel ladder frame chassis. The chassis is a partially complete vehicle and is generally procured from a manufacturer such as Freightliner or Ford Motor Company. The chassis typically consists of two parallel frame rails extending the length of the chassis and interconnected with several perpendicular cross-braces to form a ladder frame. An engine, transmission, and fuel tank(s) are generally placed between the frame rails near one end. Suspension, steering, brake, and road wheel assemblies are attached outboard of the frame rails.

The coach bodywork, which provides and encloses the living space of the motorhome, is typically made from a laminate that can include light gauge sheet metal, plywood, vinyl, and insulation. The laminate is built to be strong, lightweight, weather resistant, and durable. The coach bodywork may also include a supporting framework. The floor of the coach typically rests indirectly on the chassis frame and the vertical walls extend upwards from the floor. The roof of the coach rests on and depends on the vertical walls of the body for structural support.

A completed motorhome may be up to 45' long and 13'6" high in most states. The chassis is generally on the order of 1' high and is elevated some distance above the ground by the suspension and wheels to provide ground clearance for suspension movement and clearing obstacles in the road.

The interior flooring in current art motorhomes is typically elevated a significant amount above the upper face of the chassis in order to facilitate installing ancillary equipment. In addition, many prior art motorhomes route cooling or heating air ducts adjacent the roof structure or mount air-conditioning units on the roof. Under the overall height limit previously mentioned, these structures in or on the roof intrude into the available interior height envelope and limit the usable interior vertical space. Current motorhomes typically offer interior ceiling heights of 6'9" or less. The slide-outs in current art motorhomes do not typically provide sufficient room inside for adults to stand upright. As the slide-out area is a living space in the extended position, it can be appreciated that to be forced to stoop or crouch inside the slide-out is an inconvenience for the users of such motorhomes.

An additional difficulty arises with motorhomes of the construction described above when the vehicle drives over rough terrain. Motorhomes are essentially rectangular and are thus susceptible to twisting deflection as opposed to a triangulated structure such as a trailer or a fifth wheel. Motorhomes of the construction described above are not particularly strong under torsional forces such as arise when one comer of the vehicle drops or rises compared to the others, for example when a wheel drops into a pothole or rut or the vehicle drives over a curb or speed bump at an angle. Such maneuvers "cross-up" the rectangular frame and impose twisting forces. These forces, exerted over the relatively large dimensions of a typical motorhome, can cause significant displacement in the coach. This can cause cracks to appear in the coach, jam door and window openings, dislodge interior fitments, and generally cause wear and tear on the vehicle.

Furthermore, as stated, a motorhome is typically constructed on an unfinished vehicle chassis procured from a separate manufacturer, such as Freightliner or Ford Motor Company. As such, the motorhome manufacturer is dependent on delivery of the preassembled chassis before motorhome fabrication can begin. This results in a series production that has increased assembly time as compared to a parallel process. expensive to purchase and inventory.

From the foregoing, it can be appreciated that there is a continuing need for a stronger motorhome coach construction that also provides increased interior living space. The structure should minimize weight to the motorhome and should also maintain as low a center of gravity as possible to benefit vehicle handling characteristics. There is also a need for a method of fabricating the motorhome with increased efficiency and reduced cost and construction time.

SUMMARY OF THE INVENTION

The aforementioned needs are satisfied by the invention which, in one aspect, is a method of manufacturing a motorhome comprising the steps of assembling a three-dimensional space frame wherein the space frame defines a generally planar floor area, interconnecting the space frame with an unfinished vehicle chassis, and attaching living structure to the interconnected space frame and vehicle chassis so as to define an interior living area. In one aspect, assembling the three-dimensional space frame comprises assembling a planar ladder frame and attaching planar bulkheads to the ladder frame and in certain aspects interconnecting the space frame with the vehicle chassis comprises attaching the ladder frame to the vehicle chassis along first horizontal regions of the vehicle chassis and attaching the bulkheads along second vertical regions of the vehicle chassis.

Further aspects of the invention include installing a heating, ventilation, and air conditioning (HVAC) system such that the majority of the weight of the HVAC system is positioned below the floor area and/or installing the HVAC system such that the heating and air-conditioning portions of the HVAC system share a common air return.

Other aspects of the invention include installing the HVAC system such that the furnace and air-conditioning portions of the HVAC system are positioned outside the living area. Certain aspects of the invention include assembling the living structure such that an outside roof structure has a convex exterior contour and attaching an extensible slide-out structure to the interconnected space frame and vehicle chassis wherein the slide-out is constructed such that an adult of above-average height can stand upright inside the slide-out. In particular aspects of the invention, the frame is assembled in an upside-down orientation and inverted to a right-side-up orientation prior to attachment to the unfinished vehicle chassis.

The invention is also a method of lowering the center of mass of a motorhome comprising the steps of assembling a planar ladder frame wherein the ladder frame defines a floor plane, attaching planar structural members to the ladder frame such that, in an assembled configuration, the planar structural members extend downwards from the ladder frame, and attaching the space frame to an unfinished vehicle along an attachment plane such that the floor plane is adjacent the attachment plane less the thickness of the ladder frame and so as to create a three-dimensional space frame wherein the space frame extends below the floor plane. Certain of these aspects further comprise installing a heating, ventilation, and air conditioning (HVAC) system such that the majority of the weight of the HVAC system is positioned below the floor plane. The invention can include installing the HVAC system such that the heating and air-conditioning portions of the HVAC system share a common air return and the aspect wherein the planar structural members form storage areas positioned below the attachment plane.

Yet another aspect of the invention is a method of increasing production efficiency of motorhome manufacture, the method comprising assembling a motorhome frame separately from an unfinished vehicle chassis, attaching the frame to the unfinished vehicle chassis so as to define an interconnected space frame among the frame and unfinished vehicle chassis, and constructing a motorhome coach on the interconnected frame and vehicle chassis. These aspects can include installing a heating, ventilation, and air-conditioning (HVAC) system wherein the HVAC system has a common air return. Yet other aspects of the invention include assembling the motorhome frame separately from the unfinished vehicle chassis and attaching the frame to the unfinished vehicle chassis so as to define the interconnected space frame between the frame and unfinished vehicle chassis comprising attaching bulkheads to the frame and the vehicle chassis such that the bulkheads are structural components of the space frame and form storage areas. These and other objects and advantages will become more fully apparent from the following description taken in conjunction with the accompanying drawings.

DETAILED DESCRIPTION OF THE PREFERRED EMBODIMENTS

Figure 1:
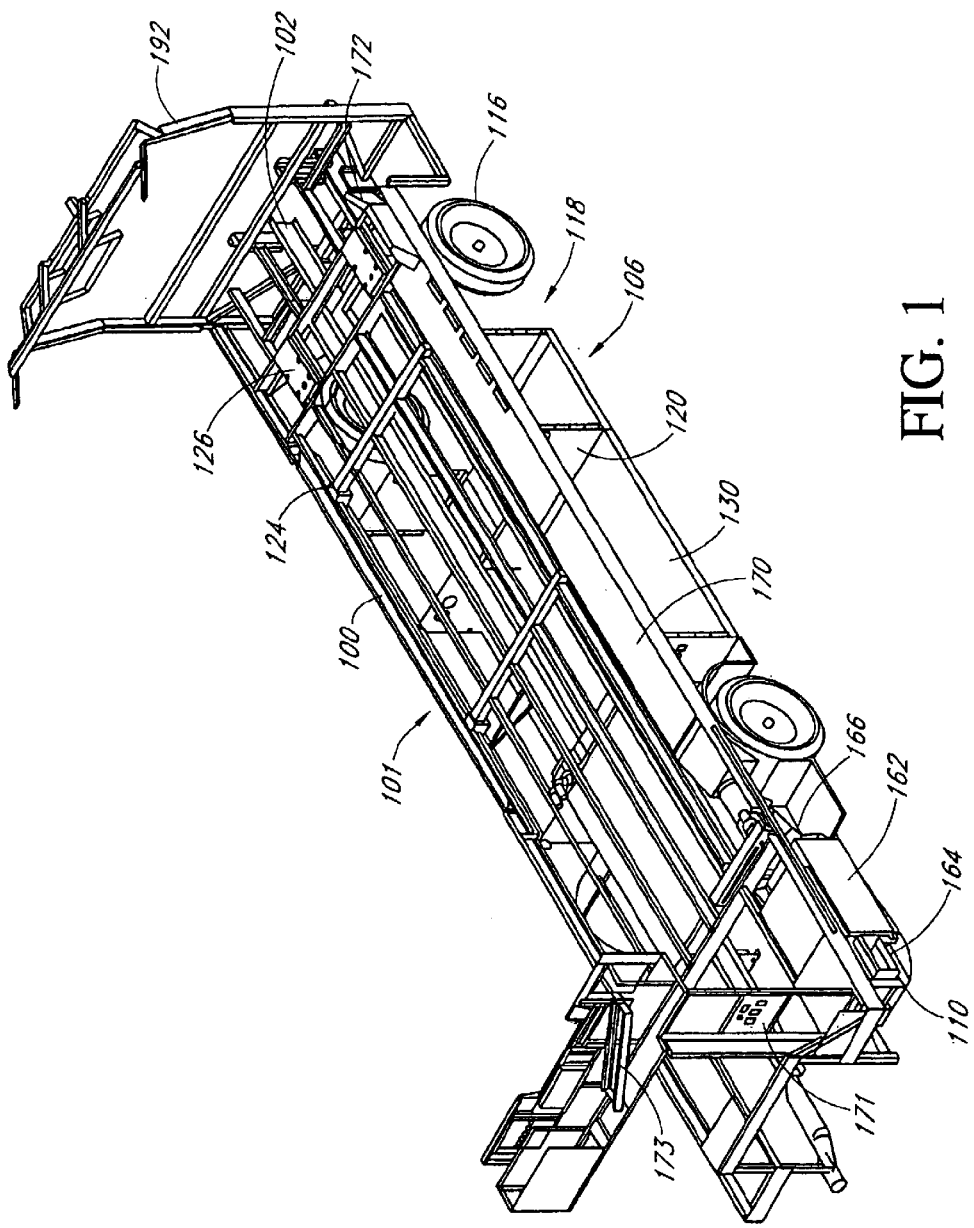
FIG. 1 is an isometric view of a preassembled vehicle frame mounted on a preassembled chassis forming the framework for a motorhome with a high interior ceiling including an HVAC system with common air return.

Reference will now be made to the drawings wherein like numerals refer to like parts throughout. FIG. 1 shows an preassembled vehicle frame 100 mounted to a preassembled chassis 102. The vehicle frame 100, mounted to the chassis 102 in the manner that will be described in greater detail below, facilitates the construction of a motorhome 104 (FIGS. 5 and 6) with a greater interior ceiling height, which in this embodiment, is at least 7'-6" in a reduced time span. The vehicle frame 100 also facilitates, in a manner described below, building a slide-out 122 (FIGS. 5 and 7) with a greater interior height. The vehicle frame 100 also facilitates mounting of relatively massive items, such as generators, furnaces, storage and holding tanks, and the like low to the ground so as to provide a lower center of mass for the motorhome 104.

The vehicle frame 100 provides a strong three dimensional space frame 118 to inhibit twisting of the vehicle frame 100 under torsional forces such as would arise when the motorhome 104 drives over uneven terrain so as to lift or drop a wheel 116 with respect to the other wheels 116. The vehicle frame 100 further defines integral storage areas 106 as part of the structure of the vehicle frame 100 in a manner that will be described in greater detail below. The vehicle frame 100 further facilitates routing of a heating, ventilation, and air conditioning (HVAC) system 110 below the beltline of the frame 100 so as to avoid intrusion of the HVAC system 110 into the interior living space of the motorhome 104 to further enable increased interior ceiling height of the motorhome 104 employing the vehicle frame 100. The HVAC system 110 comprises a furnace 164 and air conditioning unit 162 including evaporator, condenser, and compressor. These relatively heavy portions of the HVAC system 110 are installed below the beltline of the frame 100 thereby maintaining a lower e.g. than other designs.

Figure 2:
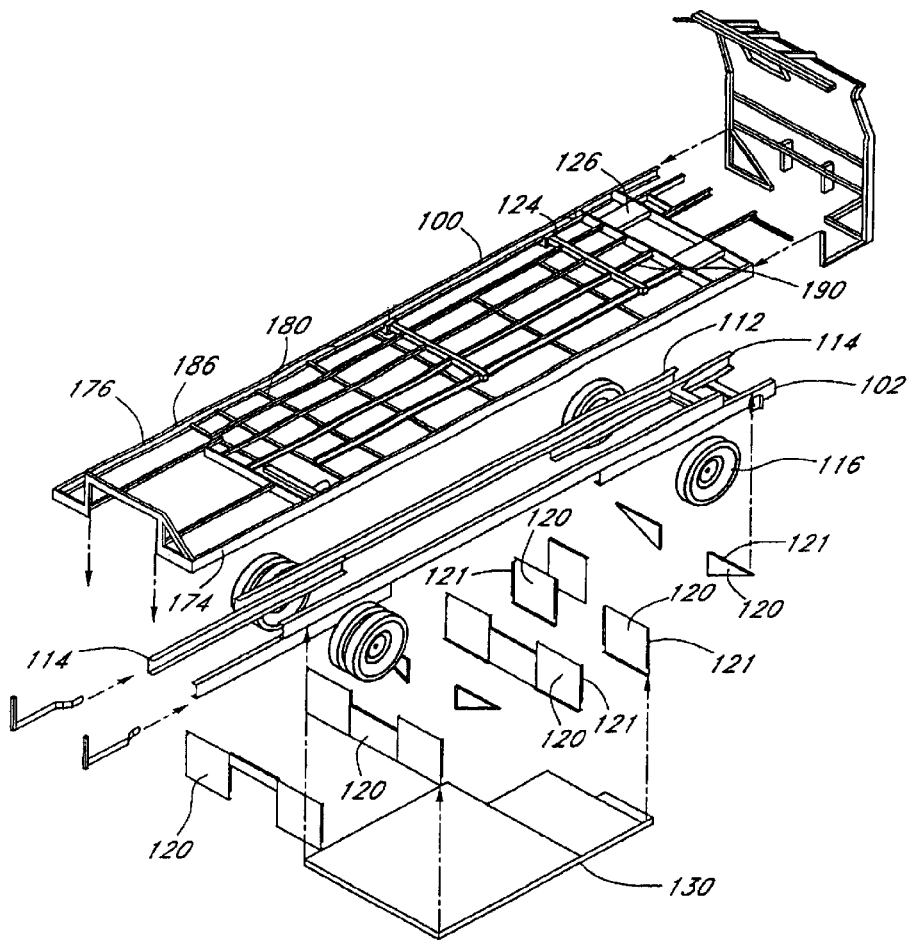
FIG. 2 is an exploded, isometric view of a partially assembled vehicle frame and a preassembled chassis.

As can be advantageously seen in FIG. 2, the chassis 102 of this embodiment, is a split rail or raised rail chassis 102 of a type known in the art. The chassis 102 of this embodiment is a diesel pusher type and is available commercially from Freightliner, LLC. of Portland, Oreg. as Model XC. The chassis 102 comprises a pair of raised rails 112 and two pairs of lower rails 114. The raised rails 112 and lower rails 114 are rigid elongate members formed of c-channel steel approximately 2¾" by 9" and approximately ¼" thick. The raised rails 112 and the lower rails 114 are all substantially parallel. A first and second end of each center rail 112 overlies a lower rail 114 over a length of approximately 402" in one embodiment and is attached along the overlying extent to the lower rail 114 in a known manner. Each pair of interconnected raised rails 112 and attached lower rails 114 are displaced a lateral distance of approximately 34" and are further interconnected by a plurality of orthogonally extending cross-beams (not illustrated) rigidly attached so as to form a ladder frame structure of a type well known in the art. The upper surfaces of the raised rails 112 defines a generally horizontally disposed attachment plane for attachment of the frame 100 to the chassis 102 in a manner that will be described in greater detail below. The rails 112, 114 also present vertically arranged surfaces for further attachment of the frame 100 to the chassis 102.

The chassis 102 also comprises a plurality of road wheels 116 with corresponding suspension, brake systems, steering, and drive mechanisms of types known in the art that are positioned at substantially the front and rear corners of the chassis 102 in the manner illustrated in FIG. 2. The road wheels 116 enable the motorhome 104 to roll along the road and to be steered and braked in a well understood manner. The road wheels 116 are positioned adjacent the overlapping raised rails 112 and lower rails 114. The chassis 102 further comprises an engine assembly, transmission, drive axle, fuel system, and electrical system (not illustrated) of types known in the art to provide the motive power for the motorhome 104. These items are advantageously located substantially within the plane of the rails 112 to lower the center of mass of the chassis 102 and thus the motorhome 104.

The chassis 102 of this embodiment is highly resistant to bending along longitudinal and transverse axes. However, the chassis 102, by itself, is susceptible to twisting along the plane of the longitudinal and transverse axes due to torsional forces. Such torsional force may arise when a road wheel(s) 116 at one corner of the chassis 102 is displaced either above or below the plane of the remaining road wheels 116. Additionally, the torque of the engine exerts a torsional force on the chassis 102.

Figure 6:
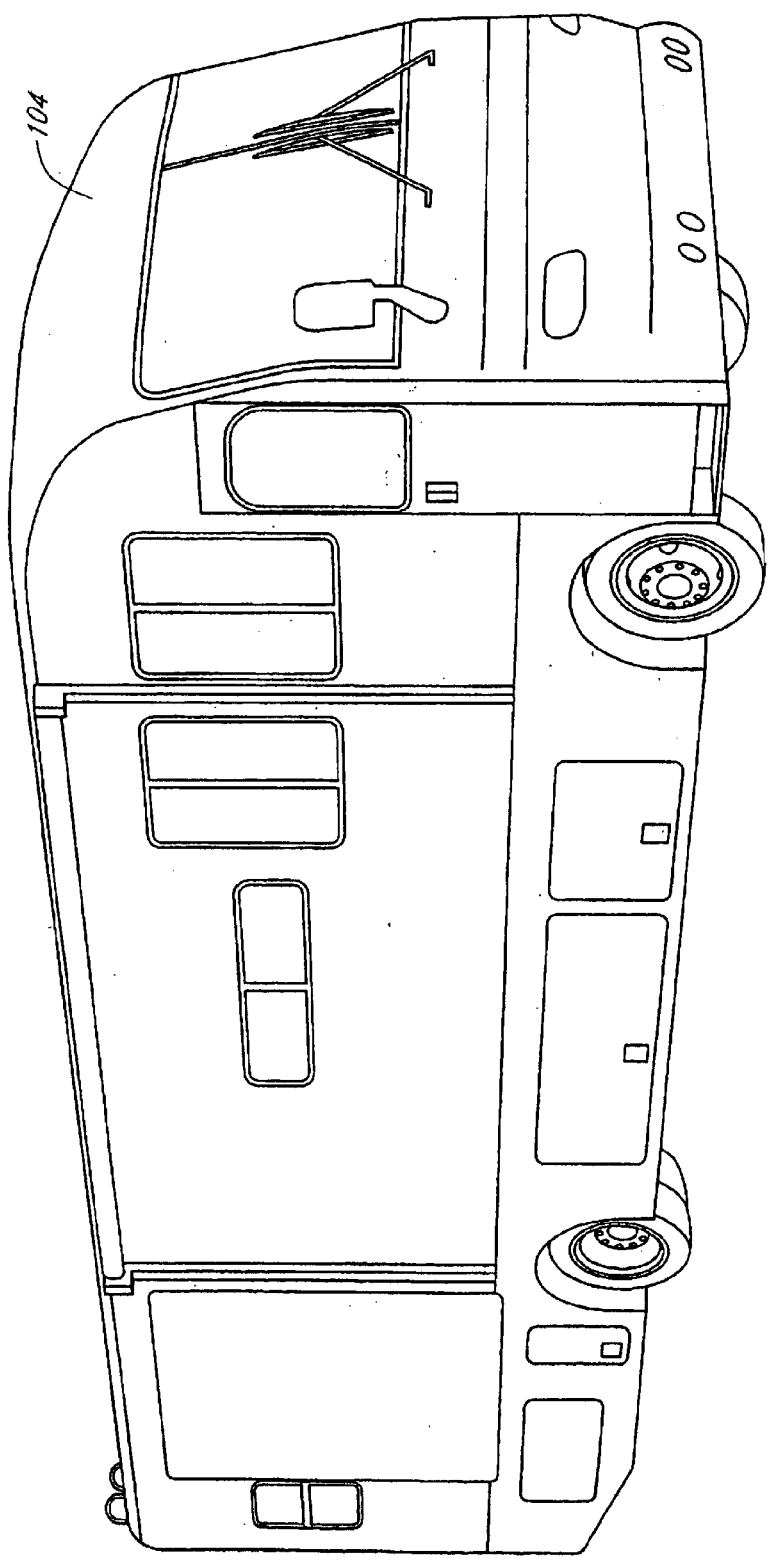
FIG. 6 is a perspective view of a completed motorhome.

The motorhome 104 of this embodiment is assembled on and around the interconnected vehicle frame 100 and the chassis 102. The motorhome 104 provides users with a vehicle having a variety of living spaces and amenities fitted within the motorhome 104. The partitioning of the interior living spaces and placement of interior amenities can be readily implemented by one of ordinary skill in the art. One embodiment of interior partitioning and furnishing of the motorhome 104 is illustrated in FIG. 6. The construction and features of the motorhome 104 will be described in greater detail below.

As is illustrated in FIGS. 1, 2, 3, and 4, the vehicle frame 100 comprises a floor section 101 which is formed from a plurality of L-channel elongate members 174, C-channel elongate members 176, and square tubing elongate members 180. The L-channel elongate members 174 of this embodiment are approximately 1½" wide, 6⅜" tall, and 34' long and are made of sheet steel approximately 0.0897" thick. The C-channel elongate members 176 of this embodiment are approximately 1½" wide, 3½" tall, and 34' long and are made of sheet steel approximately 0.0897" thick. The square channel elongate members 180 of this embodiment are approximately 2" square in cross section, approximately 97" long, and are made of sheet steel with a wall thickness of approximately ⅛". It should be appreciated that the configurations of the elongate members 174, 176, 180 herein described are simply one embodiment and that other configurations of the elongate members 174, 176, 180 could be employed by one of skill in the art without detracting from the spirit of the present invention.

Figure 3:
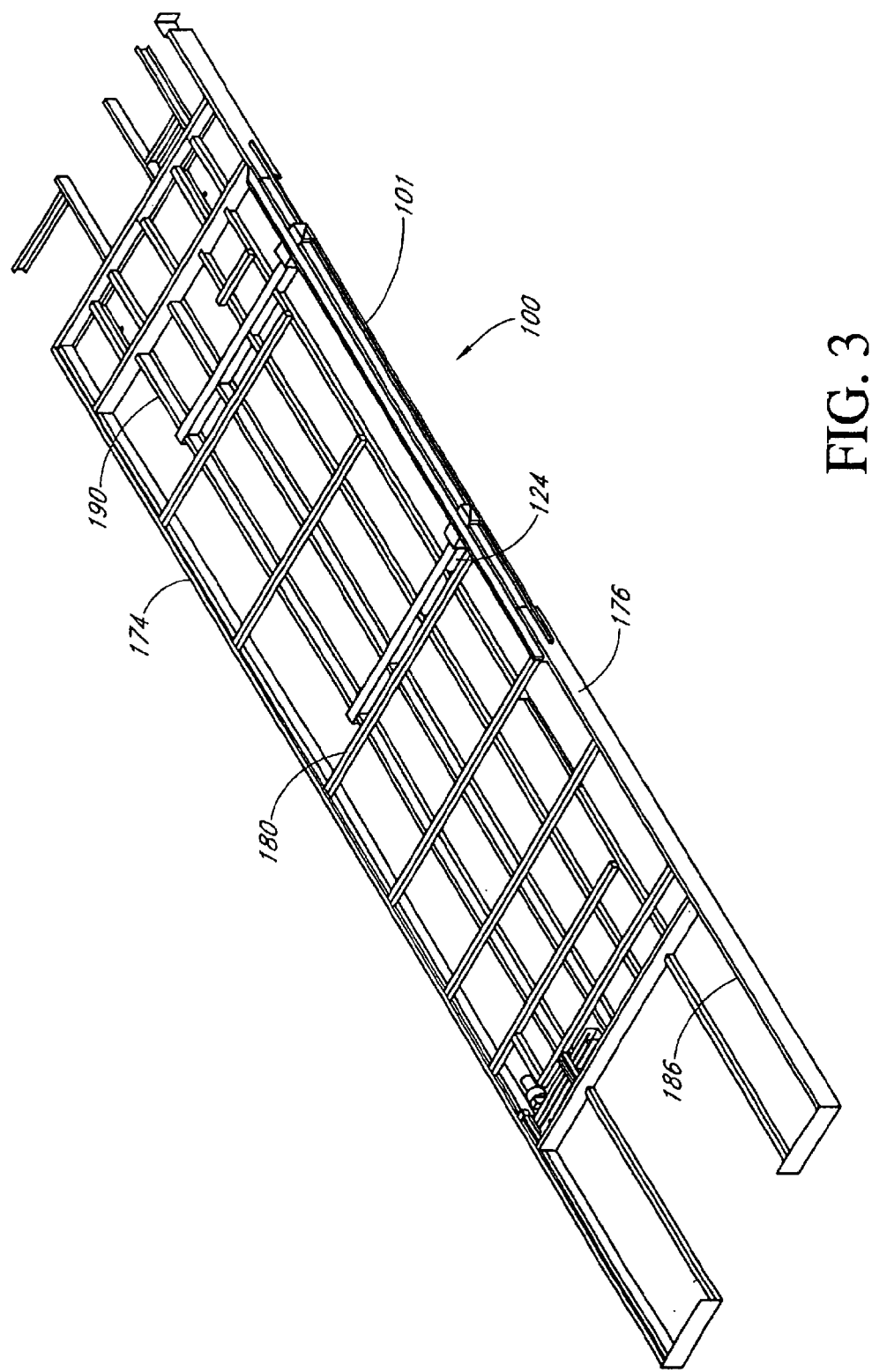
FIG. 3 is a perspective view of a partially complete preassembled frame.
Figure 4:
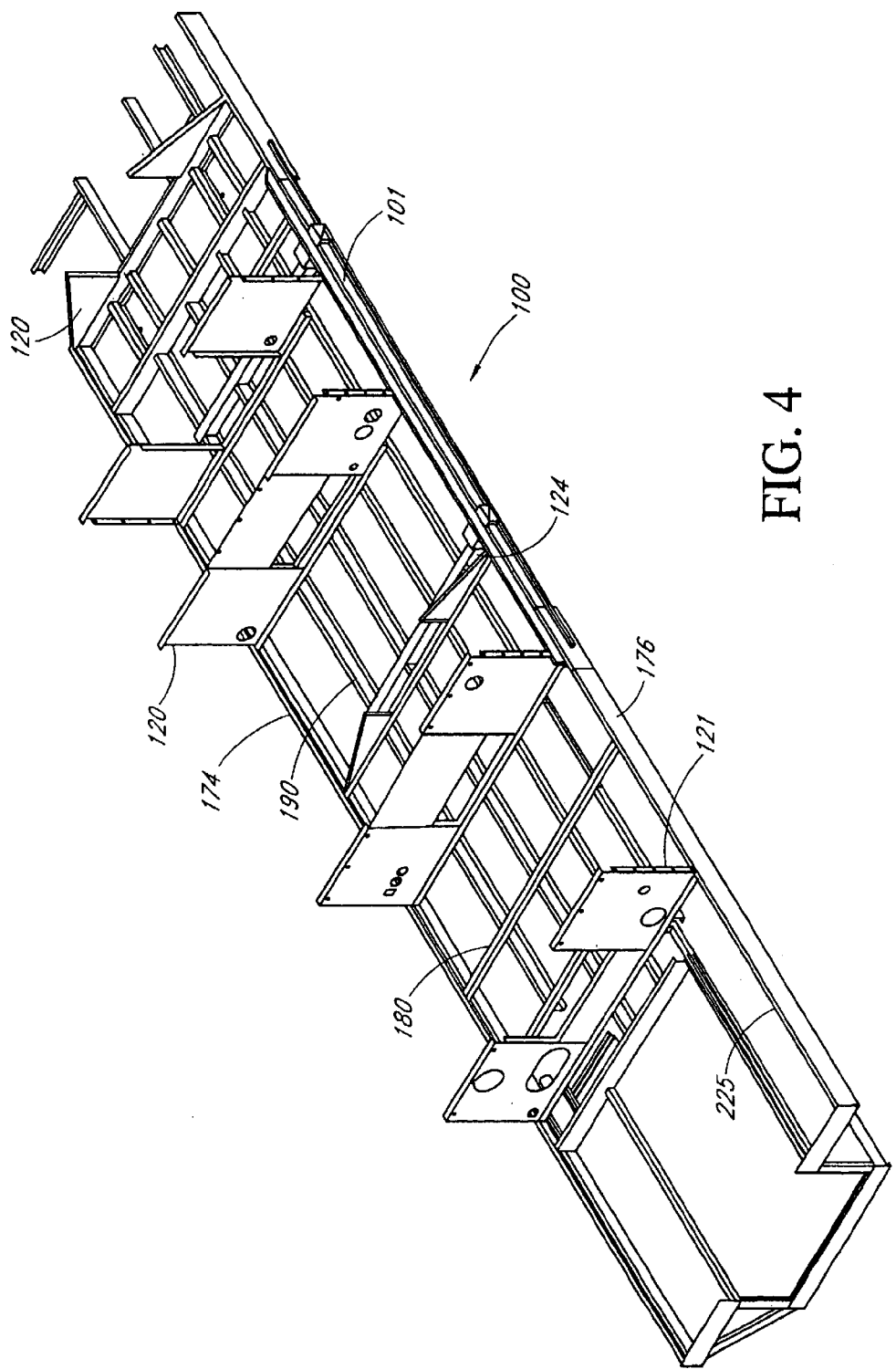
FIG. 4 is a perspective view of the frame of FIG. 3 with a plurality of bulkheads attached forming a three dimensional space frame.
Figure 5:
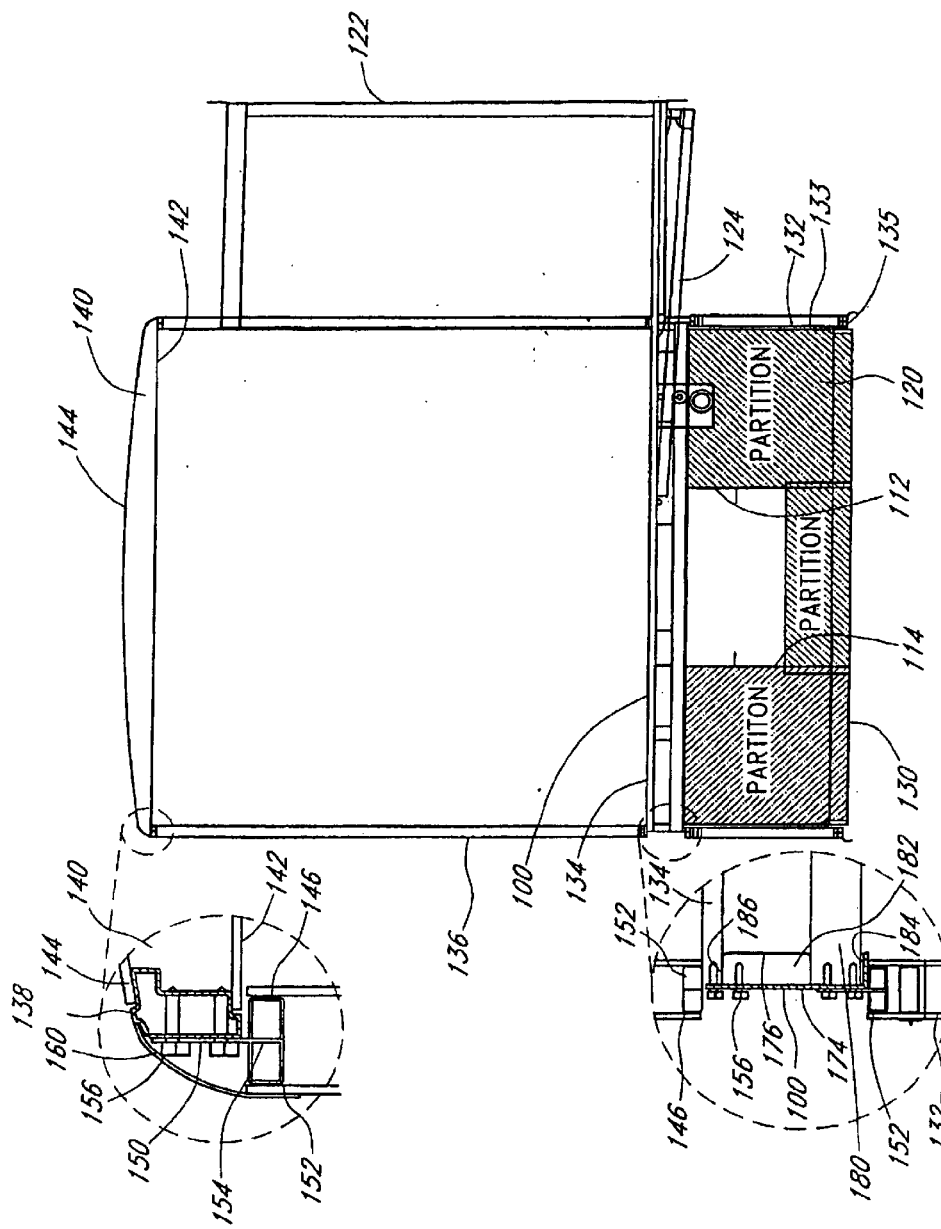
FIG. 5 is an end section view of a motorhome including the vehicle frame and a slide-out.

The L-channel elongate members 174 and the C-channel elongate members 176 extend substantially the length of the vehicle frame 100. The C-channel elongate members 176 define a cavity 182 and the L-channel elongate members 174 define an inside corner 184 as illustrated in FIGS. 3, 4, and 5, Detail B. The square channel elongate members 180 are fixedly attached via welding in a known manner to the L-channel elongate members 174 such that a first and second end of each square channel elongate member 180 is flush with the inside corner 184 of an L-channel elongate member 174 such that the two L-channel elongate members 174 are parallel, the plurality of square channel elongate members 180 extend perpendicular to each of the L-channel elongate members 174, and the plurality of square channel elongate members 180 are thus all respectively parallel.

As can be seen in FIG. 3, a C-channel elongate member 176 is fixedly attached via welding in a known manner to each L-channel elongate member 174 such that the C-channel elongate member 176 abuts a first or second end of the square channel elongate members 180 and further such that the cavity 182 of the C-channel elongate member 176 is adjacent the L-channel elongate member 174. Thus, the L-channel elongate members 174 enclose the cavities 182 and thus create closed structures. The abutment of the C-channel elongate members 176 against the square channel elongate members 180 inhibits displacement and bending of the square channel elongate members 180 with respect to the L-channel 174 and C-channel 176 elongate members. The interconnection of the L-channel 174 and C-channel 176 elongate members also defines two shelves 186 extending the length of the L-channel 174 and C-channel 176 elongate members. The interconnected L-channel 174, C-channel 176, and square channel 180 elongate members thus define a preassembled rigid ladder frame 100 structure that is highly resistant to bending and flexing.

In one embodiment, a plurality of Z-channel elongate members 190 extend longitudinally and are positioned so as to be parallel to, aligned with, and between the rails 112.

The abutment of the C-channel elongate members 176 against the square channel elongate members 180 increases the stiffness of the joint between the square channel elongate members 180 and the L-channel elongate member 174. This is because loads, which would be otherwise carried solely by the joint between the square channel elongate members 180 and the L-channel elongate members 174, can now be distributed through the C-channel elongate members 176. The interconnected L-channel 174, C-channel 176, and square channel 180 elongate members thus define a rigid ladder frame structure that is highly resistant to flexure. By making the frame 100 more rigid, the overall motorhome 104 will subsequently be more stiff to thereby enhance the performance of the motorhome 104. The upper surface of the frame 100 defines a floor plane to which additional structure of the motorhome 104 is attached as described below. Areas of the lower surface of the frame 100 are attached along the attachment plane of the chassis 102 in a manner that will be described in greater detail below.

As shown in FIG. 3, the elongate members 174, 176, 180, 190 are joined to form the vehicle frame 100 such that the frame 100 is assembled upside down. The frame 100 is assembled in an upside down orientation to facilitate attachment of other elements as will be described in greater detail below with reference to FIG. 4. The elongate members 174, 176, 180, 190 are held in position during attachment by a jig in a known manner. Thus, the frame 100 can be assembled without a chassis 102 present.

The vehicle frame 100 also comprises a plurality of transversely extending bulkheads 120 illustrated in FIGS. 1, 2, and 4. In one embodiment, the bulkheads 120 are rigid, planar pieces of steel approximately 0.0897" thick. The bulkheads 120 are rectangular, triangular, or compound rectangular in shape as can be seen in FIGS. 2 and 4. Approximately 2" of the outer edges of the bulkheads 120 are folded via known sheet metal forming techniques so as to extend generally perpendicular to the major plane of the bulkheads 120 thereby forming attachments areas 121 and also so as to increase the stiffness of the bulkheads 120. The bulkheads 120 are attached to the frame 100 so as to extend generally perpendicular to the major plane of the frame 100 in the next step in the fabrication process, illustrated in FIG. 4. As the frame 100 is upside down, the bulkheads 120 can rest on the frame 100 during attachment rather than needing to be held up if the frame 100 were in its final right side up orientation. A particular advantage of the frame 100 of this embodiment, is that the frame 100 defines a three-dimensional space frame 118 prior to attachment of the frame 100 to the chassis 102. Thus, the frame 100 is highly resistant to bending and twisting forces even if not attached to the chassis 102.

Following attachment of the bulkheads 120, the frame 100, as shown in FIG. 4, is then inverted and placed on the chassis 102 as illustrated in FIG. 1. The frame 100 is attached to the chassis 102 along the attachment plane, in this embodiment, at the points of intersection of the transversely extending elongate members 180 and the longitudinally extending rails 112. The bulkheads 120 of the frame 100 are also fixedly attached to the vertical sides of the rails 112, 114 of the chassis 102 to further interconnect the chassis 102 and the vehicle frame 100. The bulkheads 120 are attached to the vehicle frame 100 and the chassis 102 so as to extend downward from the vehicle frame 100 and the chassis 102. The rigid interconnection of the bulkheads 120 with the chassis 102 and the vehicle frame 100 boxes in the rails 112, 114 of the chassis 102 further defining a three-dimensional space frame structure 118 adjacent the chassis 102. The rigidly interconnected vehicle frame 100 and chassis 102, boxed in by the bulkheads 120, are much more resistant to twisting forces than the chassis 102 by itself. In addition, the floor plane of the frame 100 is advantageously positioned immediately adjacent the upper surface of the chassis 102 less the thickness of the ladder portion of the frame 100. This maximizes the available vertical extent of the motorhome 104 available for interior living space within a set total exterior height.

As stated above, the motorhome 104 manufacturer ordinarily orders the incomplete vehicle chassis 102 from another manufacturer, like Freightliner. The chassis 102 is a significant fraction of the overall material cost of the motorhome 104. With the fabrication method described above, the frame 100 can be prefabricated to completion before the chassis 102 is obtained. More specifically, a major portion of the assembly of the motorhome 104 can be completed before the chassis 102 is received, and then the comparatively quick task of joining the completed frame 100 to the chassis 102 can be achieved once the chassis 102 is received. This aspect of the invention facilitates a just-in-time manufacturing capability thereby reducing the time capital is tied up in the chassis 102 prior to completion of the motorhome 104. This aspect of the invention results in cost savings for the manufacturer of the motorhome that can be passed on as price reductions to the consumer and/or increase the manufacturer's profit margin.

The motorhome 104 also comprises a front loop 192 as shown in FIG. 1. The loop 192 is a generally rectangular structure attached at the front of the motorhome 104 to the frame 100. The loop 192 provides structural support for interior body assemblies in the driver's and front passenger's area as well as the front exterior bodywork of the motorhome 104 and the front windshield. The loop 192 is assembled from a plurality of elongate steel members via welding in a similar manner to that previously described with respect to the frame 100.

Figure 7:
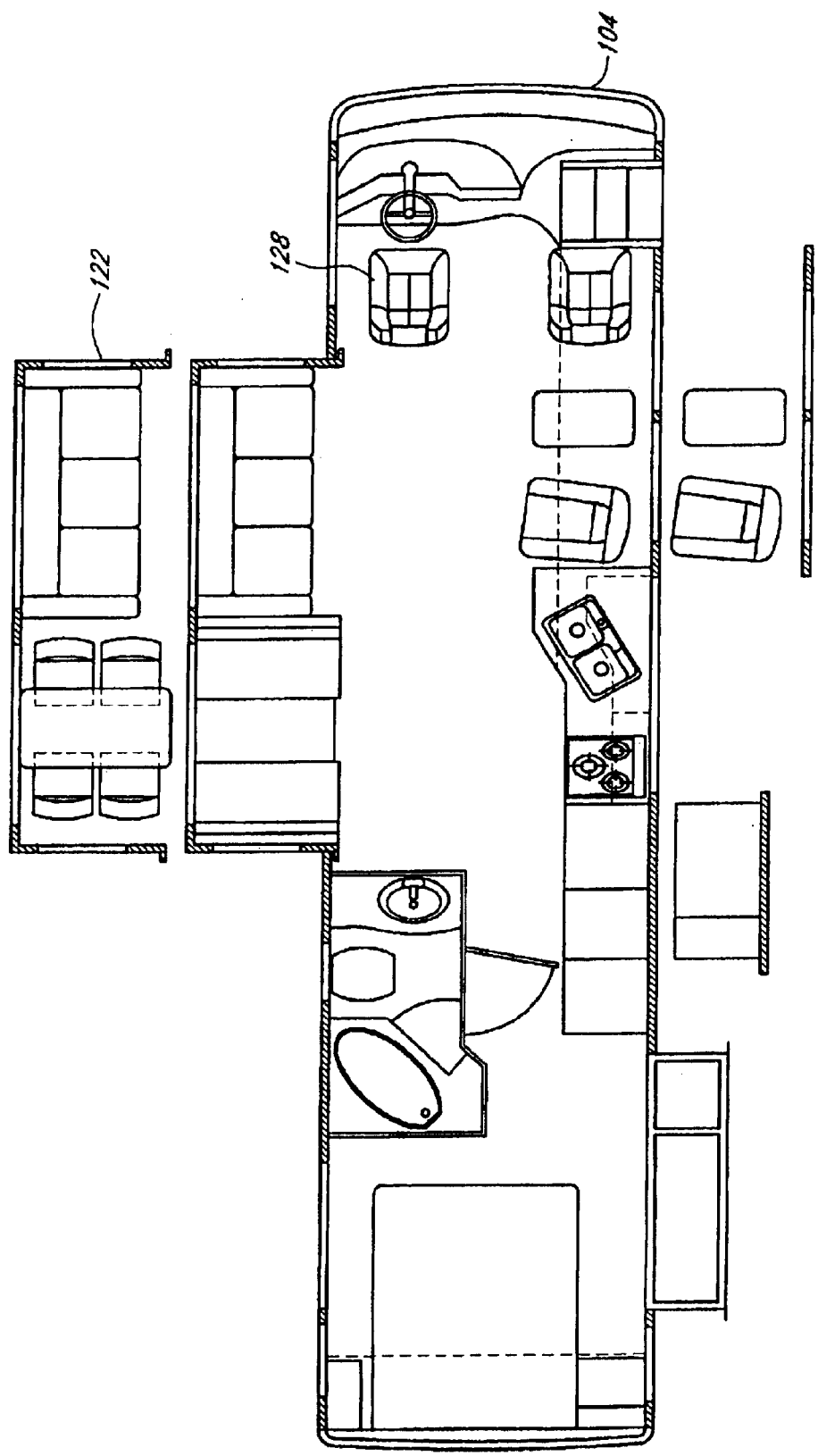
FIG. 7 is a top view of one embodiment of an interior build-out in a motorhome.

The motorhome 104 of this embodiment comprises a slide-out 122 (FIGS. 5 and 7). The slide-out 122 is a movable structure contained within the motorhome 104 that is extensible between a retracted, travel position and an extended, live-in position. The slide-out 122 is a generally rectangular structure closed on the top and bottom and three sides and open on the remaining fourth side. The slide-out 122 of this particular embodiment is approximately 3½' deep, 13'-4" long, and of 6'-1" interior height. The slide-out 122, in the extended, live-in position, provides additional interior living space to the users of the motorhome 104.

In particular, the slide-out 122 provides an additional 45 ½ square feet of living space when the slide-out 122 is extended. A particular advantage of the slide-out 122 of this embodiment is that the interior ceiling height is approximately 6'1" as referred above. This enables a person of above average height to stand up within the slide-out 122. This greatly increases the convenience and livability of motorhomes 104 employing the vehicle frame 100 which enables the slide-out 122 as herein described. As will be described in greater detail herein below, the increased living space in the main section of the motorhome 104 and in the slide-out 122 is due, in part, to the configuration of the vehicle frame 100.

The slide-out 122 includes a slide-out mechanism 124. The slide-out mechanism 124, of this particular embodiment, is an electro-mechanical assembly of a type known in the art. The slide-out mechanism 124 extends and retracts the slide-out 122 between the retracted, travel position and the extended, live-in position in response to user commands. The slide-out mechanism 124 also physically supports the slide-out 122 in transition between the travel and live-in positions. The slide-out mechanism 124 may comprise other mechanisms such as manual, pneumatic, or hydraulic without departing from the spirit of the present invention. However, the electro-mechanical mechanism of the preferred embodiment of the present invention affords advantages over other means. In particular, the slide-out mechanism 124 of this embodiment offers greater user friendliness than known mechanisms for extending slide-out rooms which are manually actuated. Furthermore, the slide-out mechanism 124 of this embodiment is lighter and requires less maintenance than known pneumatic or hydraulic slide-out extension mechanisms.

The slide-out 122 and slide-out mechanism 124 are attached to the vehicle frame 100. The vehicle frame 100, when interconnected with the chassis 102 and the bulkheads 120 as previously described, is highly resistant to bending and twisting. Thus, the slide-out 122 and slide-out mechanism 124, attached to the rigid structure of the vehicle frame 100 has a low susceptibility to jamming or sticking due to flexing of the motorhome 104 as it is driven about. The slide-out 122 is also able to support a significant amount of weight, such as furniture and occupants. It should be appreciated that alternative embodiments of the invention include additional slide-outs 122.

The vehicle frame 100 also comprises seat supports 126. The seat supports 126 are, in one embodiment, rectangular structures formed from sheet steel approximately ⅛" thick and are approximately 12¹³⁄₁₆" by 22½". The seat supports 126 are fixedly attached to the vehicle frame 100 via a plurality of bolts and/or welding in a known manner adjacent the front end of the vehicle frame 100. The seat supports 126 provide a support and attachment structure for passenger seats 128 of known types. The passenger seats 128 provide seating accommodations for driver and passengers in a known manner.

The vehicle frame 100 of this embodiment, also comprises two storage area floors 130. The storage area floors 130 are rigid composite rectangular members approximately 3¼" thick, 95" wide, and 98" long and 3¼" thick, 65" wide, and 44" long. The storage area floors 130 are a composite of tube steel, foam, and Luan vacuum bonded together. The storage area floors 130 are fixedly attached along the attachment areas 121 along lower edges of the bulkheads 120 with welds and/or bolts in a known manner. The storage area floors 130, together with the bulkheads 120, define storage areas 106. The storage areas 106 of this embodiment extend substantially the full width of the motorhome 104. The storage areas 106 of this embodiment are two rectangular spaces approximately 95" by 98" by 25½" and 65" by 42" by 25½". The storage areas 106 of this embodiment are approximately 8"–9" higher than comparable storage areas would be in an embodiment employing a straight rail design chassis. In particular, the raised rails 112 of the chassis 102 are 8"–9" higher than the lower rails 114 and thus provide 8"–9" additional height to the storage areas 106.

The storage area floor 130, comprising a rigid member fixedly attached along the length of the lower edges of the bulkheads 120, further defines the three-dimensional structural space frame 118. The structural space frame 118, comprising a plurality of rigid panels and rigid elongate members fixedly interconnected along their adjoining edges and arranged at right angles to each other, forms a structurally rigid space structure. It will be appreciated that distorting the space frame 118 would require separation of the joints between component members and/or bending of the rigid members. This further increases the torsional rigidity of the interconnected vehicle frame 100, chassis 102, bulkheads 120, and storage area floor 130 assembly.

The vehicle frame 100 also comprises a plurality of storage area doors 132 (FIG. 5). In one embodiment, the storage area doors 132 are rectangular, rigid structures approximately 2⅜" thick by 25½" by 8' long. The storage area doors 132 are a vacuum bonded composite of fiberglass, Luan plywood, block foam insulation, and aluminum. The storage area doors 132 enclose the storage areas 106. The storage area doors 132 have an insulation value of R11 and thus provide thermal insulation to the interior of the storage areas 106. The storage area doors 132 also retain objects placed in the storage areas 106 from falling out as the motorhome 104 moves about or from unintentional removal by curious children or thieves. The storage area doors 132 also inhibit intrusion of pests and windblown dirt, dust, and rain into the interior of the storage areas 106 thereby befouling the interior and possibly damaging items stored therein.

The storage area doors 132 are hingedly attached along either a top edge or a vertical edge of the storage area doors 132 to the vehicle frame 100. The storage area doors 132 can be raised to an elevated position to facilitate placing items into or removing items from the interior of the storage areas 106. The storage area doors 132 are further positionable in a closed position to seal the interior of the storage areas 106. The storage area doors 132, in a preferred embodiment, further comprise weather seals 133 and a latching mechanism 135. The weather seals 133 are resilient, tubular structures of a type known in the art that are attached with adhesive to the periphery of the storage area doors 132 on the side of the storage area doors 132 facing the motorhome 104. The weather seals 133 improve the seal between the storage area doors 132 and the storage areas 106 in a known manner. The latching mechanism 135 is a lock mechanism of a type well known in the art which lockably secures the storage area doors 132 in the closed position to further inhibit unintentional opening of the storage area doors 132.

The motorhome 104 also comprises a coach floor 134. The coach floor 134 of this embodiment is formed from a plurality of rectangular pieces of ¾" tongue and groove plywood, placed so as to abut each other in a coplanar fashion. The coach floor 134 is a planar, rectangular structure approximately 97¼" by 420⅝". The coach floor 134 is placed directly on the floor section 101 of the vehicle frame 100 so as to rest on the shelves 186. The coach floor 134 is attached to the floor section 101 of the vehicle frame 100 via a plurality of screws and adhesive in a known manner. The coach floor 134 provides a continuous flooring surface for the motorhome 104 to support occupants and furniture in the interior of the motorhome 104. The coach floor 134 also provides a support and attachment surface for padding, carpeting, tile, linoleum, or other interior floor finishings.

As is illustrated in FIGS. 1, 2, and 5, the floor section 101 of the vehicle frame 100 is mounted such that the bottom surface of the floor section 101 is positioned directly on the rails 112. As such, the coach floor 134 is elevated above the rails 112 of the chassis 102 by a distance substantially equal to the thickness of the members comprising the floor section 101. This results in the upper surface of the coach floor 134 being flush with driver platform from front to back. The substantially planar floor section 101 yields a better bond between the floor section 101 and the chassis 102.

Moreover, the floor section 101 is attached to the upper surface of the raised rails 112 and is also connected to the sides and the bottom side of the raised rails 112 and the lower rails 114 via the bulkheads 120 that are also connected to the floor section 101. As is illustrated in FIGS. 1 and 2, the floor section 101 is attached to the raised rails 112 and the lower rails 114 at periodic intervals along the length of the floor section 101 of the vehicle frame 100. By interconnecting the floor section 101 to the raised rails 112 and the lower rails 114 using the space frame 118 that encloses the raised rails 112 and the lower rails 114 along the top and sides, twisting of the frame 100 when the wheels 116 of the motorhome 104 are vertically displaced from each other is reduced.

The motorhome 104 also comprises coach walls 136. The coach walls, in one embodiment, 136 are generally planar, rectangular structures approximately 2⅜" thick, 90" tall, and 416⅞" long. The coach walls 136 are made from a laminated composite of fiberglass, phenolic Luan plywood, foam insulation, and interior decor panel which are vacuum bonded together with an aluminum frame. The coach walls 136 provide physical structure to the motorhome 104. The coach walls 136 also insulate the interior of the motorhome 104 against heat transfer and sound. The coach walls 136, of this embodiment, are approximately ½" thicker than walls typically used in the art and have a higher insulation rating than other known walls. The insulation rating of the coach walls 136 of this embodiment is R11. The coach walls 136 also comprise various openings to accommodate windows, doors, slide-outs 122, vents, etc. the formation and placement of which are readily realized by one skilled in the art.

The motorhome 104 also comprises a coach roof 140. The coach roof 140, in one embodiment, is a planar, rectangular structure approximately 97¼" wide by 371" long. The coach roof 140 is formed from a laminate of a rubber outer roofing layer, Luan plywood, ultra-light high-density block foam insulation core, and a one-piece carpeted inner ceiling layer bonded with an extruded aluminum welded superstructure 138.

The coach roof 140 is substantially planar along a lower face 142 and convexly contoured along an upper face 144. The coach roof 140 is approximately 5½" thick at the thickest region near the center of the coach roof 140 and convexly tapers off to the sides and towards the front and back to a thickness of approximately 2½" along the edges of the coach roof 140. Thus, the upper face 144 of the coach roof 140 has a crowned contour. The crowned contour of the upper face 144 of the coach roof 140 inhibits pooling of water and accumulation of snow and debris on the coach roof 140. Thus, the motorhome 104, fitted with the coach roof 140 as herein described, can more readily shed water, snow, and debris and minimize the deleterious effects of retaining water or debris in contact with the materials of the coach roof 140. The crowned contour of the upper face 144 also improves the structural durability of the coach roof 140 because avoiding accumulation of water and snow will minimize the vertical weight loads of heavy snow or water which could potentially otherwise bow the coach roof 140 leading to distortion, cracking, or separation of joints. The crowned contour of the coach roof 140 also improves the aesthetics of the motorhome 104 because more readily shedding debris helps to minimize adhesion of dirt and thus maintains a cleaner appearance to the exterior of the motorhome 104.

The motorhome 104 also comprises a plurality of attachment assemblies 146. The attachment assemblies 146 are extruded from aluminum alloy in a known manner. The attachment assemblies 146 are elongate members that extend substantially the length of the motorhome 104. The attachment assemblies 146 interconnect the coach walls 136, a storage area skirt frames 132a, the coach roof 140, and the vehicle frame 100 in a manner that will be described in greater detail below.

As viewed in a perpendicular cross-section (as shown in FIG. 5) the attachment assemblies 146 comprise a planar attachment area 150, a hollow rounded, closed rectangular channel 152 region, and an inner partition 154. It should be appreciated that the attachment assemblies 146 are unitized, extruded assemblies and the planar attachment area 150, the rectangular channel 152, and the inner partition 154 herein described are regions of the attachment assemblies 146 and are materially and structurally continuous with each other.

The attachment area 150 is a rectangular, planar region of the attachment assemblies 146 that is long as the length of the coach and extends vertically from the rectangular channel 152 approximately 2⅛" and provides a convenient structure for attaching the attachment assemblies 146. The rectangular channel 152 is a closed, structural element of the attachment assemblies 146 approximately 2" by ¾" and increases the stiffness of the attachment assemblies 146 to bending and twisting according to well understood structural principles. The inner partition 154 extends vertically approximately ⅝" within the rectangular channel 152 and spans and internally partitions the rectangular channel 152 and further stiffens the attachment assemblies 146. The inner partition 154 is substantially coplanar with the attachment area 150.

The attachment assemblies 146 are fixedly attached to an upper and lower edge of the coach walls 136 such that the rectangular channels 152 are positioned between outer layers of the coach walls 136 as shown in FIG. 3, details A and B. The attachment assemblies 146 are further attached to the coach walls 136 such that the rectangular channels 152 are positioned flush with upper and lower edges of the coach walls 136. The attachment areas 150 of the attachment assemblies 146 thus extend beyond the edges of the coach walls 136 approximately 2⅛". The attachment assemblies 146 are attached to the coach walls 136 with an adhesive, such as MA425 from Plexus of Danvers, Mass. in a known manner.

The coach walls 136 with the attachment assemblies 146 attached are placed on the coach floor 134 such that the attachment area 150 is adjacent the edge of the coach floor 134 and the rectangular channel 152 rests on the coach floor 134. This placement of the coach walls 136 and attached attachment assemblies 146 results in the edge of the coach floor 134 occupying the corner defined between the attachment area 150 and the rectangular channel 152. This placement further results in the coach walls 136 straddling the coach floor 134 such that approximately half of the thickness of the coach walls 136 is overlying the coach floor 134. This enables the coach walls 136 to partially rest on the coach floor 134 for additional vertical load support while still maintaining clearance for recessed attachment of the coach walls 136 such that the attachment devices do not protrude beyond the outer face of the coach walls 136.

The attachment assemblies 146 in one embodiment are attached to the coach floor 134 and the vehicle frame 100 via a plurality of screws 156 positioned approximately every 5" along the length of the attachment assemblies 146. The screws 156 of this embodiment are 10–16×1" of a type known in the art and installed in a known manner.

The coach roof 140 is positioned on the coach walls 136 such that the attachment areas 150 are adjacent the edges of the coach roof 140 and such that the coach roof 140 partially overlies the coach walls 136. The attachment areas 150 are attached to the coach roof 140 via a plurality of screws 156 placed approximately every 5" along the length of the edges of the coach roof 140.

The motorhome 104 also comprises a plurality of trim pieces 160. The trim pieces 160 are elongate members of semi-rigid material, such as vinyl, approximately 20' long, 5" wide and 1/16" thick. The trim pieces 160 are arc-shaped in cross section and are attached to the aluminum superstructure 138 via a friction fit achieved in a known manner. The trim pieces 160 are positioned to abut each other so as to extend the full length of the coach roof 140. The outer rubber roofing layer of the coach roof 140 overlies the trim pieces 160.

The trim pieces 160 cover the screws 156 attaching the coach roof 140 to the coach walls 136. The trim piece 160 obscures the view of the screws 156 to thereby improve the aesthetics of the motorhome 104. The trim piece 160 also shields the screws 156 and the upper edges of the coach walls 136 from rain, snow, and debris. Thus the trim piece 160 inhibits accumulation of water and debris adjacent the screws 156 and the upper edges of the coach walls 136 so as to inhibit corrosion and fouling of the screws 156 and the coach walls 136. The trim piece 160 also inhibits intrusion of water and debris into the interior of the coach walls 136 which could compromise the strength and structural integrity of the coach walls 136.

The HVAC system 110 in this embodiment comprises the air conditioning unit 162, the furnace 164, a manifold 166, a duct 170, at least one register 172, an intake 171, and a filter 173 as illustrated in FIG. 1. The intake 171 (shown in section view in FIG. 1) commonly directs air from the interior of the motorhome 104 to the air conditioning unit 162 and the furnace 164. The filter 173 is positioned within the intake 171 and filters the air entering the HVAC system 110. The air conditioning unit 162 receives air from the interior of the motorhome 104 via the intake and cools this filtered incoming air and directs the cool air into the interior of the motorhome 104. The furnace 164 warms incoming air and directs the warm air into the interior of the motorhome 104. The manifold 166 receives air from both the air conditioning unit 162 and the furnace 164 and routes the air to the duct 170. The duct 170 extends substantially the length of the interior of the motorhome 104. The duct 170 carries the warm or cool air to at least one register 172. The registers 172 direct cool or warm air, received from the duct 170, into the interior of the motorhome 104. The registers 172 includes a screen to inhibit objects falling into the interior of the registers 172 and the duct 170.

The common intake 171 is advantageously formed on two sides by wood paneling that serves both to direct the air inside the intake 171 and also provide interior trim in the interior of the motorhome 104. In addition, by directing air to both the air-conditioning unit 166 and the furnace 164, the common intake 171 of this embodiment, obviates the need for the separate air intakes for the A/C unit and the furnace of other designs. The common intake 171 of this embodiment also facilitates the use of a single filter 173 for the HVAC system 110. This single filter 173 reduces the time and expense of maintaining the HVAC system 110 by the end user as compared to other designs with multiple filters for the separate A/C and furnace systems. This commonality reduces the time and expense of construction of the HVAC system 110 as well as reducing the weight thereof.

The HVAC system 110, of this embodiment, is located within or below the plane of the chassis 102. Positioning the air conditioning unit 162 and the furnace 164, which are both relatively heavy items, within or below the plane of the chassis 102 further lowers the center of mass of the motorhome 104 to thereby improve the road handling of the motorhome 104. The placement of the HVAC system 110 of this embodiment also distances the duct 170 and registers 172 from the coach roof 140. Other known motorhome designs rout HVAC ducting adjacent the roof of the vehicle which exposes the cool air to thermal heating from sunlight incident on the roof of the vehicle. In the motorhome 104 of this embodiment, the duct 170, register 172, and air conditioning unit 162 are shaded from incident sunlight by the motorhome 104. Thus, the HVAC system 110 can more efficiently provide cool air to the interior of the motorhome 104. This improves the occupant's comfort in hot weather and reduces fuel costs for powering the HVAC system 110.

A further advantage of the HVAC system 110 of this embodiment is that the air conditioning unit 162, duct 170, and register 172 which carry cool air are located below the living space of the motorhome 104. As is well understood by those of ordinary skill in the art, a cooler than ambient surface, such as the air conditioning unit 162, duct 170, and register 172 induces liquid water to condense out of the atmosphere if the temperature of the surface is at or below the dew point. When air conditioning ducting is routed above the living space of a motorhome, liquid water that condenses on the ducting is drawn downwards by gravity. This can induce liquid water to intrude into walls, ceilings, and other interior materials. It can be appreciated that liquid water can readily damage the structural integrity of typical motorhome building materials. Liquid water can also stain and warp interior materials, damaging the aesthetics of a motorhome. The air conditioning unit 162, duct 170, and registers 172 of this embodiment are positioned below the living space of the motorhome 104 and thus water that condenses out during use of the HVAC system 110 is drawn downwards and away from the motorhome 104 without intruding into the living spaces of the motorhome 104.

An additional advantage of the HVAC system 110 of this embodiment is that placement of the HVAC system 110 adjacent and below the beltline of the chassis 102 obviates the need to place portions of an HVAC system on the roof of the motorhome 104. Other known HVAC systems place portions of the system on the exterior roof of a motorhome. This requires that the major plane of the outer roof be lowered with respect to the roof of the present invention so as to maintain the overall height restrictions previously mentioned. Lowering the exterior roof height results in corresponding lowering of the interior ceiling height and a corresponding reduction in the interior space and livability of such a motorhome.

Yet another advantage of the HVAC system 110 of this embodiment is that placement of the HVAC system 110 adjacent and below the beltline of the chassis 102 distances the furnace 164 and air conditioning unit 162 from the interior of the motorhome 104. The air conditioning unit 162 and furnace 164 are relatively noisy in operation. Placing the HVAC system 110 outside the interior of the motorhome 104 distances the noise sources of the air conditioning unit 162 and the furnace 164 and thus provides a quieter, more comfortable living environment for users of the motorhome 104.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A method of manufacturing a motorhome comprising the steps of:

assembling a three-dimensional space frame wherein the space frame defines a generally planar floor area having a first surface and a second surface with a plurality of reinforcing generally planar bulkheads extending upward from the first surface wherein the reinforcing generally planar bulkheads are spaced along the first surface and define a longitudinally extending recess;

interconnecting the space frame with a vehicle chassis having two parallel longitudinal extending rails by inverting the assembled three dimensional space frame and lowering the three dimensional space frame such that the two parallel extending rails are positioned within the recess; and attaching living structure to the interconnected space frame and vehicle chassis so as to define an interior living area.

2. The method of claim 1, wherein assembling the three-dimensional space frame comprises:

assembling a planar ladder frame; and attaching planar bulkheads to the ladder frame.

3. The method of claim 2, wherein interconnecting the space frame with the vehicle chassis comprises attaching the ladder frame to the vehicle chassis along first horizontal regions of the vehicle chassis and attaching the bulkheads along second vertical regions of the vehicle chassis.

4. The method of claim 1, further comprising installing a heating, ventilation, and air conditioning (HVAC) system such that the majority of the weight of the HVAC system is positioned below the floor area.

5. The method of claim 4, further comprising installing the HVAC system such that the heating and air-conditioning portions of the HVAC system share a common air return.

6. The method of claim 4, wherein the HVAC system is installed such that a furnace and an air-conditioning portions of the HVAC system are positioned outside the living area.

7. The method of claim 1, wherein the living structure is assembled such that an outside roof structure has a convex exterior contour.

8. The method of claim 1, further comprising attaching an extensible slide-out structure to the interconnected space frame and vehicle chassis wherein the slide-out is constructed such that an adult of above-average height can stand upright inside the slide-out.

9. The method of claim 1, wherein the space frame is assembled in an upside-down orientation and inverted to a right-side-up orientation prior to attachment to the chassis.

* * * * *